(12) United States Patent
Agarwal et al.

(10) Patent No.: US 9,444,741 B2
(45) Date of Patent: Sep. 13, 2016

(54) FACILITATING NETWORK FLOWS

(71) Applicant: Broadcom Corporation, Irvine, CA (US)

(72) Inventors: Puneet Agarwal, Cupertino, CA (US); Bruce Hui Kwan, Sunnyvale, CA (US); William Brad Matthews, San Jose, CA (US); Vahid Tabatabaee, Cupertino, CA (US)

(73) Assignee: BROADCOM CORPORATION, Irvine, CA (US)

( * ) Notice: Subject to any disclaimer, the term of this patent is extended or adjusted under 35 U.S.C. 154(b) by 102 days.

(21) Appl. No.: 14/041,424

(22) Filed: Sep. 30, 2013

(65) Prior Publication Data

US 2014/0254357 A1 Sep. 11, 2014

Related U.S. Application Data

(60) Provisional application No. 61/775,983, filed on Mar. 11, 2013.

(51) Int. Cl.
*H04L 12/801* (2013.01)

(52) U.S. Cl.
CPC ..................................... *H04L 47/12* (2013.01)

(58) Field of Classification Search
CPC .............................. H04L 47/10; H04L 47/30
USPC ......................................................... 370/229
See application file for complete search history.

(56) References Cited

U.S. PATENT DOCUMENTS

| | | | | |
|---|---|---|---|---|
| 6,144,636 A * | 11/2000 | Aimoto et al. | | 370/229 |
| 7,609,640 B2 * | 10/2009 | Ahuja et al. | | 370/236 |
| 8,750,109 B2 * | 6/2014 | Gerber | | H04L 47/365 370/230 |
| 8,797,877 B1 * | 8/2014 | Perla et al. | | 370/235 |
| 2003/0137938 A1 * | 7/2003 | Belanger | | H04L 12/14 370/230 |
| 2003/0147347 A1 * | 8/2003 | Chen et al. | | 370/229 |
| 2006/0092836 A1 * | 5/2006 | Kwan et al. | | 370/229 |
| 2006/0227708 A1 * | 10/2006 | Tan et al. | | 370/235 |
| 2007/0025242 A1 * | 2/2007 | Tsang | | 370/229 |
| 2007/0025250 A1 * | 2/2007 | Shimonishi | | H04L 69/16 370/231 |
| 2007/0036168 A1 * | 2/2007 | Hsiao et al. | | 370/412 |
| 2007/0226347 A1 * | 9/2007 | Chu et al. | | 709/227 |
| 2007/0280261 A1 * | 12/2007 | Szymanski | | 370/395.4 |
| 2008/0117907 A1 * | 5/2008 | Hein | | 370/392 |
| 2009/0147676 A1 * | 6/2009 | Shimonishi | | H04L 1/1607 370/230 |
| 2010/0062777 A1 * | 3/2010 | Nadas | | H04L 47/10 455/445 |
| 2011/0216650 A1 * | 9/2011 | Jin et al. | | 370/230 |
| 2012/0005369 A1 * | 1/2012 | Capone et al. | | 709/236 |
| 2012/0311171 A1 * | 12/2012 | Holley et al. | | 709/231 |
| 2013/0114481 A1 * | 5/2013 | Kim | | G06F 15/16 370/310 |
| 2013/0250853 A1 * | 9/2013 | Eravelli | | H04L 69/163 370/328 |
| 2013/0322246 A1 * | 12/2013 | Zhou | | H04L 47/11 370/235 |
| 2014/0153387 A1 * | 6/2014 | Wu | | H04L 47/30 370/230 |
| 2014/0192639 A1 * | 7/2014 | Smirnov | | 370/230 |
| 2014/0233390 A1 * | 8/2014 | Schmid | | H04L 47/125 370/236 |

FOREIGN PATENT DOCUMENTS

WO    WO 2013020602 A1 *    2/2013

* cited by examiner

*Primary Examiner* — Melvin Marcelo
*Assistant Examiner* — Peter Solinsky
(74) *Attorney, Agent, or Firm* — Oblon, McClelland, Maier & Neustadt, L.L.P.

(57) ABSTRACT

Disclosed are various embodiments for facilitating network flows in a networked environment. In various embodiments, a switch transmits data using an egress port that comprises an egress queue. The switch sets a congestion notification threshold for the egress queue. The switch generates a drain rate metric based at least in part on a drain rate for the egress queue, and the congestion notification threshold is adjusted based at least in part on the drain rate metric.

20 Claims, 8 Drawing Sheets

FACILITATING NETWORK FLOWS

CROSS-REFERENCE TO RELATED APPLICATIONS

This application claims the benefit of and priority to U.S. Provisional Application Ser. No. 61/775,983, filed Mar. 11, 2013, the entire contents of which is hereby incorporated herein by reference.

BACKGROUND

In a networked environment, data may be transmitted between multiple computing devices. Due to various factors, a congestion point may develop in the networked environment. The congestion point may result in decreased network performance.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
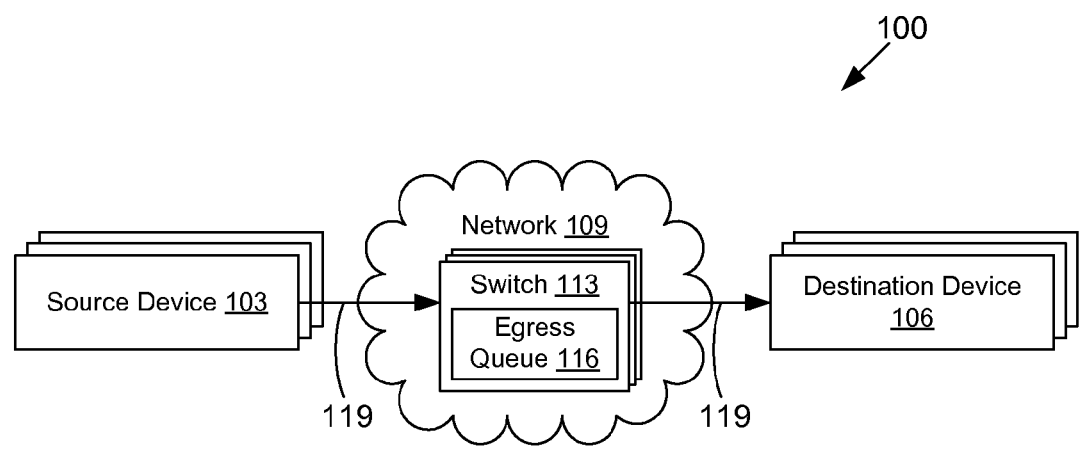
FIG. 1 is a drawing of an example of a networked environment according to various embodiments of the present disclosure.

The present disclosure relates to facilitating flows between computing devices in a networked environment. With reference to FIG. 1, shown is an example of a networked environment 100 according to various embodiments. The networked environment 100 includes, for example, one or more source devices 103, one or more destination devices 106, and potentially other devices in data communication via a network 109. Such a networked environment 100 may comprise a data center or another type of computing environment. The networked environment 100 may be located at a single facility in various embodiments. In alternative embodiments, the networked environment 100 may comprise an arrangement of devices at multiple facilities.

The source device 103 is representative of multiple source devices 103 that may be coupled to the network 109. The source device 103 is a computing device that is operable to transmit data to one or more destination devices 106 or to other devices using the network 109. The source device 103 is also be operable to receive data from the destination device 106, from another source device 103, and/or from other devices using the network 109. In various embodiments, the source device 103 may be embodied in the form of a processor-based system, such as a server computer or other type of computing device.

The destination device 106 is representative of multiple destination devices 106 that may be coupled to the network 109. The destination device 106 may be a computing device that is operable to receive data that originated from or was forwarded by the source device 103. The destination device 106 may also be operable to transmit data to the source device 103 and/or potentially other devices. Accordingly, the destination device 106 may be embodied in the form of a processor-based system, such as a server computer or other type of computing device.

The network 109 facilitates the transmission of data between the source device 103, the destination device 106, and/or potentially other devices. To this end, the network 109 may comprise one or more switches 113 and/or potentially other devices. The switches 113 route and/or relay data within the network 109 so that the data may be transferred from a source to a destination. For instance, the switches 113 route and/or relay data between the source device 103 and the destination device 106.

Each switch 113 may comprise one or more egress queues 116. The egress queues 116 may store outbound data for the switch 113 prior to the data being transmitted by the switch 113. The outbound data may be stored in the egress queues 116, for example, so that the data may be processed, to await bandwidth becoming available on the network 109, or for other purposes.

Additionally, the switches 113 may perform various actions responsive to the quantity of data stored in their respective egress queues 116. For instance, a switch 113 may generate various types of congestion indicators in response to the quantity of data in the egress queue 116 exceeding a predetermined congestion notification threshold. As a non-limiting example, if the quantity of data exceeds the congestion notification threshold, the switch 113 may packetize and transmit the data from the egress queue 116 such that the packet contains a flag, one or more marked bits, or any other type of indicator to indicate that the egress queue 116 is associated with a congestion point in the network 109.

The network 109 may employ one or more transport layer protocols that facilitate the transmission of data between the source device 103, the destination device 106, and/or other devices. As a non-limiting example, the network 109 may employ a protocol that is based at least in part on the Data Center Transmission Control Protocol (DCTCP).

The source device 103 may transmit one or more flows 119 through the network 109. The flow 119 may comprise packets or other types of data. Each packet may include, for example, a header, a payload, and potentially other types of data. Additionally, associated with the flow 119 may be one or more backchannels. The backchannel may be used to facilitate the transmission of the flow 119 and/or improve other aspects of the network 109. For instance, in various embodiments, acknowledgement packets, which may be used to indicate whether reception of packets in the flow 119 were successful, may be transmitted via the backchannels. As an example, the destination device 106 may transmit acknowledgment packets via the backchannel to the source device 103 to indicate whether packets have been successfully received by the destination device 106.

Next, a general discussion of an example of at least a portion of the operation of the networked environment 100 is provided. In the following discussion, it is assumed that the source device 103 and the destination device 106 are powered and are in communication via the network 109. In addition, it is assumed that the congestion notification threshold for the egress queue 116 for the switch 113 has been set to an initial value. Such an initial value may be set, for example, by a network administrator.

The source device 103 may initiate a new flow 119 by which packets of data are transmitted from the source device 103 through the network 109 to the destination device 106. Upon the switch 113 receiving a packet in the flow 119, the switch 113 may perform various functionality. For example, the switch 113 may determine the egress port to which the data in the packet is to be provided. Thereafter, the data may be provided to the egress queue 116 for the determined egress port.

With the data in the egress queue 116, the switch 113 prepares the data for packetization, and the data may wait to be transmitted from the egress port. In addition, the switch 113 may identify whether the amount of data, which may include the data for the flow 119 and potentially other data from other flows 119, exceeds the congestion notification threshold for the egress queue 116. If the amount of data in the egress queue 116 exceeds the congestion notification threshold, it may be an indication that the switch 113 is associated with a congestion point in the network 109.

As such, if the amount of data in the egress queue 116 exceeds the congestion notification threshold, the switch 113 may provide the outgoing data in the egress queue 116 with a congestion notification. As non-limiting examples, the switch 113 may packetize the outgoing data in the egress queue 116 such that the packets include one or more bits, one or more flags, or any other type of marker that indicates that the outgoing data was involved with a congestion point in the network 109. For instance, if the network 109 employs a protocol based at least in part on DCTCP, such a congestion notification may be an Explicit Congestion Notification (ECN).

If the amount of data in the egress queue 116 does not exceed the congestion notification threshold, the switch 113 may determine to forego associating the data in the egress queue 116 with a congestion notification. In alternative embodiments, the switch 113 may set one or more bits, one or more flags, or any other type of marker for an outgoing packet that explicitly indicates that the data is not associated with a congestion point in the network 109.

Thereafter, the switch 113 transmits the packetized data to the destination device 106. Upon receiving the one or more packets, the destination device 106 may identify whether a congestion notification was provided in conjunction with the packet. If so, the destination device 106 may recognize that the received packet is associated with a congestion point in the network 109. If there was no congestion notification provided with a received packet, it may be implied that the received packet was not involved with a congestion point in the network 109.

After receiving a packet that was transmitted from the source device 103 through the network 109, the destination device 106 may prepare to transmit an acknowledgement to the source device 103. The acknowledgement indicates to the source device 103 whether a corresponding packet was successfully received by the destination device 106. In various embodiments, the destination device 106 may packetize data into an acknowledgement packet that comprises various information related to the packet that was received by the destination device 106.

An acknowledgement packet may include, for example, a congestion notification that indicates whether the packet received by the destination device 106 was involved with a congestion point in the network 109. For instance, if the destination device 106 identifies that the received packet was involved with a congestion point in the network 109, the destination device 106 may transmit an acknowledgement packet to the source device 103 that includes data indicating that the received packet was involved with a congestion point in the network 109. If the destination device 106 has identified that a received packet was not involved with a congestion point in the network 109, the destination device 106 may generate and transmit an acknowledgement packet that does not include a congestion notification. Accordingly, the source device 103 may recognize that an acknowledgement packet that lacks a congestion notification was not involved with a congestion point in the network 109. In alternative embodiments, if the destination device 106 has identified that a received packet was not involved with a congestion point in the network 109, the destination device 106 may generate and transmit an acknowledgement packet that includes data that explicitly identifies that the packet transmitted by the source device 103 was not involved with a congestion point in the network 109.

The acknowledgement packet may be transmitted through the network 109 to the source device 103 using, for example, a backchannel associated with the flow 119. Upon the source device 103 receiving an acknowledgement packet from the destination device, the source device 103 may perform various actions as will be described later.

Figure 2:
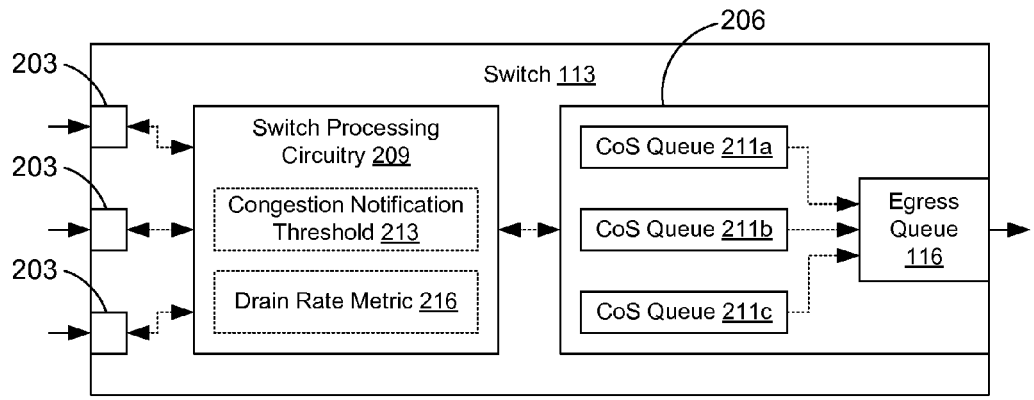
FIG. 2 is a drawing of an example of a switch in the networked environment of FIG. 1 according to various embodiments of the present disclosure.

With reference to FIG. 2, shown is a drawing of an example of the switch 113 according to various embodiments of the present disclosure. The switch 113 may include one or more ingress ports 203 and one or more egress ports 206. In addition, the switch 113 may comprise switch processing circuitry 209 and potentially other components and/or functionality.

The ingress ports 203 may be operable to receive and/or process incoming data. For example, an ingress port 203 may receive data transmitted by the source device 103 (FIG. 1). In addition, the ingress ports 203 may be operable to provide the received data to the switch processing circuitry 209 and/or to other components in the switch 113.

The egress port 206 may be operable to transmit and/or process outgoing data. For example, the egress port 206 may transmit data to the destination device 106 (FIG. 1). The data to be transmitted by the egress port 206 may be provided by the switch processing circuitry 209 and/or other components in the switch 113.

According to various embodiments, the egress port 206 may include the egress queue 116, one or more Class of Service (CoS) queues 211*a*-211*c*, and potentially other components and/or functionality. The egress queue 116 may store outbound data for the egress port 206 prior to the data being transmitted by the egress port 206.

In various embodiments, the network 109 (FIG. 1) may support various Quality of Service (QoS) levels for the data. In this regard, the network 109 may be operable to provide different levels of network performance for different classes of data. To this end, the switch 113 or other component in the network 109 may classify the data in the network 109 according to the desired QoS for the data. As such, each of the CoS queues 211*a*-211*c* may be operable to store and/or process data that has been assigned a classification that differs from the other CoS queues 211*a*-211*c*. For instance, the CoS queue 211*a* may be configured to store and/or process data that is associated with a higher QoS than the CoS queue 211*b*. The switch 113 may employ a scheduling policy to arbitrate the transfer of data from the CoS queues 211a-211c to the egress queue 116 such that the desired QoS for the data may be obtained. For example, such a scheduling policy may arbitrate the transfer of data such that the CoS queue 211a has a higher throughput than the CoS queue 211b.

The switch processing circuitry 209 may be operable to perform various processing functions for the switch 113 and/or the network 109. For example, the switch processing circuitry 209 may execute the scheduling policy for the CoS queues 211a-211c. In addition or alternatively, the switch processing circuitry 209 may determine a congestion notification threshold 213, determine a drain rate metric 216, and/or potentially perform other processing tasks.

The congestion notification threshold 213 may be a value that specifies when the switch 113 is to identify that the egress queue 116 is associated with a congestion point in the network 109. For example, the congestion notification threshold 213 may specify a quantity of data in the egress queue 116 that may trigger the switch 113 providing congestion notifications in conjunction with the data transmitted to the destination device 106. In this regard, if the quantity of data in the egress queue 116 is greater than the quantity specified by the congestion notification threshold 213, the switch 113 may provide the congestion notifications. If the quantity of data in the egress queue 116 is less than or equal to the quantity specified by the congestion notification threshold 213, the switch 113 may not provide the congestion notifications. According to various embodiments, the congestion notification threshold 213 may be dynamic. In this regard, the switch processing circuitry 209 may update the congestion notification threshold 213 from time to time.

The drain rate metric 216 may be a value that corresponds to the drain rate of the egress queue 116. As a non-limiting example, the drain rate of the egress queue 116 may correspond to the amount of data transmitted from the egress queue 116 over a particular time duration. In various embodiments, the switch processing circuitry 209 may use the drain rate metric 216 to determine, for example, the congestion notification threshold 213 from time to time.

Next, a general discussion of an example of at least a portion of the operation of the switch 113 is provided. In the following discussion, it is assumed that the switch 113 is routing and relaying data within the network 109. In addition, it is assumed that the congestion notification threshold 213 for the egress queue 116 for the switch 113 has been set to an initial value. Such an initial value may be set, for example, by a network administrator.

From time to time, the switch processing circuitry 209 may decide to identify the drain rate for the egress queue 116. For example, in various embodiments, the switch processing circuitry 209 may periodically identify the drain rate for the egress queue 116. To this end, the switch processing circuitry 209 may use a configurable timer that indicates when the drain rate is to be identified. According to various embodiments, the timer period may be configurable, for example, by a network administrator, by setting one or more parameters that specifies the period.

Upon deciding that the drain rate for the egress queue 116 is to be identified, the switch processing circuitry 209 may identify the drain rate. To this end, the switch processing circuitry 209 may calculate the drain rate. For example, the switch processing circuitry 209 may identify the number of bytes of data that were transmitted from the egress queue 116 over a predetermined time period.

With the drain rate for the egress queue 116 identified, the switch processing circuitry 209 may identify whether the drain rate for the egress queue 116 is increasing or decreasing. To this end, the switch processing circuitry 209 may compare the most recently identified drain rate to an earlier identified drain rate. If the most recently identified drain rate is greater than the earlier identified drain rate, the switch processing circuitry 209 may identify that the drain rate is increasing. If the most recently identified drain rate is less than the earlier identified drain rate, the switch processing circuitry 209 may identify that the drain rate is decreasing.

The switch processing circuitry 209 may adjust the drain rate metric 216 based at least in part on the drain rate. Additionally, in various embodiments, the switch processing circuitry 209 may adjust the drain rate metric 216 responsive to whether the drain rate is increasing or decreasing. According to various embodiments, the switch processing circuitry 209 may be operable to adjust the drain rate metric 216 such that the drain rate metric 216 increases at substantially the same rate as the rate at which the drain rate increases. As a non-limiting example, if the drain rate has been identified as increasing, the switch processing circuitry 209 may set the drain rate metric 216 using the following equation:

$$m = d, \qquad \text{[Equation 1]}$$

where m is the value of the drain rate metric 216, and d is the number of bytes transmitted from the egress queue 116 during the time duration used for calculating the drain rate.

Additionally, according to various embodiments, the switch processing circuitry 209 may be operable to adjust the drain rate metric 216 such that the drain rate metric 216 decreases at a rate that is less than the rate at which the drain rate decreases. As a non-limiting example, if the drain rate has been identified as decreasing, the switch processing circuitry 209 may set the drain rate metric 216 using the following equation:

$$m = m_0 * w + (1-w) * d, \qquad \text{[Equation 2]}$$

where m is the value of the drain rate metric 216, $m_0$ is the previous value of the drain rate metric 216, w is a weighting value ranging from 0 to 1, and d is the number of bytes transmitted from the egress queue 116 during the time duration used for calculating the drain rate.

Once the switch processing circuitry 209 has determined the drain rate metric 216, the switch processing circuitry 209 may adjust the congestion notification threshold 213 responsive to the drain rate metric 216. To this end, the switch processing circuitry 209 may access a table stored in a memory that is accessible to the switch processing circuitry 209. The table may, for example, comprise a listing of congestion notification thresholds 213 that correspond to various values for the drain rate metric 216. Thus, the switch processing circuitry 209 may identify the congestion notification threshold 213 that corresponds to the drain rate metric 216 in the table. In alternative embodiments, the congestion notification threshold 213 may be calculated using an equation that uses, for example, the drain rate metric 216 and potentially other data as inputs.

Once the congestion notification threshold 213 has been determined, the switch processing circuitry 209 may use this information to determine whether the egress queue 116 is involved with a congestion point for the network 109. For instance, if the amount of data in the egress queue 116 exceeds the congestion notification threshold 213, the switch processing circuitry 209 may associate the outgoing data in the egress queue 116 with a congestion notification as discussed above. Additionally, the process of determining and setting the congestion notification threshold 213 may be repeated from time to time. Thus, the congestion notification threshold 213 may be adaptive to various conditions within the network 109. Additionally, the network 109 may facilitate the use of DCTCP while providing QoS support.

Figure 3:
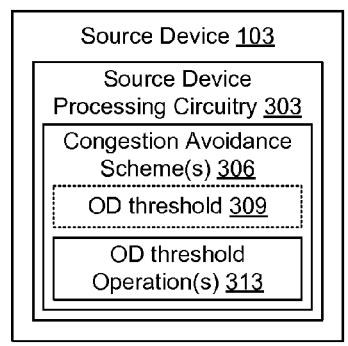
FIG. 3 is a drawing of an example of a source device in the networked environment of FIG. 1 according to various embodiments of the present disclosure.

With reference to FIG. 3, shown is a drawing of an example of the source device 103 according to various embodiments of the present disclosure. The source device 103 may include source device processing circuitry 303 and potentially other components and/or functionality.

The source device processing circuitry 303 may be operable to perform various processing functions for the source device 103 and/or the network 109 (FIG. 1). For example, the source device processing circuitry 303 may execute one or more congestion avoidance schemes 306 and/or perform other types of functionality. Each of the congestion avoidance schemes 306 may be, for example, a process that aims to control the amount of data congestion in the network 109 and thus increase the performance of the network 109.

In various embodiments, one or more of the congestion avoidance schemes 306 may be associated with an outstanding data threshold 309. The outstanding data threshold 309 may, for example, specify the maximum amount of data that has been transmitted by the source device 103 and for which the source device 103 has not received a reception acknowledgement. As a non-limiting example, the outstanding data threshold 309 may specify a number of data packets that have been transmitted by the source device 103 and for which the source device 103 has not received a reception acknowledgment from the destination device 106. Accordingly, in embodiments in which the network 109 employs a protocol based at least in part on DCTCP, the outstanding data threshold 309 may be the congestion window (CWND).

The source device processing circuitry 303 may also be operable to perform one or more outstanding data threshold operations 313. The outstanding data threshold operations 313 may, for example, modify various characteristics associated with the outstanding data threshold 309. Additionally, multiple outstanding data threshold operations 313 may be performed concurrently or with partial concurrence according to various embodiments.

According to various embodiments, one or more of the outstanding data threshold operations 313 may increase the value of the outstanding data threshold 309. Such an outstanding data threshold operation 313 may include multiple phases according to various embodiments. For example, a first phase of an outstanding data threshold operation 313 may exponentially increase the value of the outstanding data threshold 309 relative to time. As a non-limiting example, during the first phase of an outstanding data threshold operation 313, the value for the outstanding data threshold 309 may be increased by a factor of m for each round trip time for a packet in the flow 119 (FIG. 1), where m is a predetermined number. As such, for embodiments in which the network 109 employs DCTCP, a first phase for an outstanding data threshold operation 313 may be the DCTCP exponential grow phase, which is also referred to as the "slow-start phase," for a congestion window (CWND).

As another example, a second phase of an outstanding data threshold operation 313 may linearly increase the value of the outstanding data threshold 309 relative to time. As a non-limiting example, during the second phase of an outstanding data threshold operation 313, the value of the outstanding data threshold 309 may be incremented by p each round trip time for a packet in the flow 119, where p is a predetermined number. As such, for embodiments in which the network 109 employs DCTCP, a second phase for an outstanding data threshold operation 313 may be the DCTCP linear growth phase, which is also referred to as the "congestion avoidance phase," for a congestion window (CWND).

Additionally, one or more of the outstanding data threshold operations 313 may decrease the value of the outstanding data threshold 309. For example, a factor by which the outstanding data threshold 309 is to be decreased may be identified, and an outstanding data threshold operation 313 may decrease the outstanding data threshold 309 responsive to this factor. As a non-limiting example, the following equation may be used to determine the factor by which the outstanding data threshold 309 is to be decreased:

$$a = (1-g)*a + g*F, \qquad \text{[Equation 3]}$$

where a is the factor by which the outstanding data threshold 309 is to be decreased, g is a value ranging from 0 to 1, and F is the fraction of acknowledgement packets corresponding to the flow 119 that comprise a congestion indicator and that have been received within the last round trip time epoch. As a non-limiting example, an outstanding data threshold operation 313 may use the following equation to decrease the value of the outstanding data threshold 309:

$$t = t * \left(1 - \frac{a}{2}\right), \qquad \text{[Equation 4]}$$

where t is the previous value of the outstanding data threshold 309 and a is the value of a from equation 3. The value for a in equation 3 and equation 4 may be determined from time to time. Similarly, decreasing the value of the outstanding data threshold 309 may be performed from time to time.

Next, a general discussion of an example of at least a portion of the operation of the source device 103 is provided. In the following discussion, it is assumed that the source device 103 has been transmitting a flow 119 to the destination device 106 via the network 109. Additionally, it is assumed that the source device processing circuitry 303 is operable to perform a first outstanding data threshold operation 313 that increases the value of the outstanding data threshold 309 and a second outstanding data threshold operation 313 that decreases the value of the outstanding data threshold 309. In addition, it is assumed that the first outstanding data threshold operation 313 that increases the value of the outstanding data threshold 309 comprises a first phase for which the outstanding data threshold 309 increases exponentially with respect to time and a second phase for which the outstanding data threshold 309 increases linearly with respect to time.

With respect to the outstanding data threshold operation 313 that increases the value of the outstanding data threshold 309, the source device processing circuitry 303 may initiate the process of increasing the value of the outstanding data threshold 309 from time to time. For example, according to various embodiments, the process may be initiated periodically such that the timing corresponds with the round trip time for a packet in the flow 119.

Upon the outstanding data threshold operation 313 that increases the value of the outstanding data threshold 309 being initiated, the source device processing circuitry 303 may identify whether the outstanding data threshold operation 313 is in the first phase or the second phase. In various embodiments, the outstanding data threshold 309 may be used to determine whether the outstanding data threshold operation 313 is in the first phase or the second phase. In such embodiments, the value of the outstanding data threshold 309 may be compared to a predetermined threshold. If the value of the outstanding data threshold 309 is less than the predetermined threshold, the source device processing circuitry 303 may determine that the outstanding data threshold operation 313 is to be in the first phase. On the other hand, if the value of the outstanding data threshold 309 is greater than or equal to the predetermined threshold, the source device processing circuitry 303 may determine that the outstanding data threshold operation 313 is to be in the second phase.

If the source device processing circuitry 303 identifies that the outstanding data threshold operation 313 is in the first phase, the source device processing circuitry 303 may increase the value for the outstanding data threshold 309 by a factor of m, where m is a predetermined number. Thus, during the first phase of the outstanding data threshold operation 313, the value of the outstanding data threshold 309 may increase exponentially with respect to time. If the source device processing circuitry 303 identifies that the outstanding data threshold operation 313 is in the second phase, the source device processing circuitry 303 may increase the value of the outstanding data threshold 309 by p, where p is a predetermined number. Thus, during the second phase of the outstanding data threshold operation 313, the value of the outstanding data threshold 309 may increase linearly with respect to time.

With respect to the second outstanding data threshold operation 313 that is operable to decrease the value of the outstanding data threshold 309, the source device 103 may obtain from the destination device 106 an acknowledgement packet that comprises a congestion indicator. This congestion indicator may indicate that the flow 119 from the source device 103 is involved with a congestion point in the network 109. As such, receiving a congestion indicator may initiate the source device processing circuitry 303 performing the second outstanding data threshold operation 313 that is operable to decrease the value of the outstanding data threshold 309.

Upon determining that the outstanding data threshold operation 313 that is operable to decrease the value of the outstanding data threshold 309 is to be performed, the source device processing circuitry 303 may initiate the process of decreasing the outstanding data threshold 309. According to various embodiments, the outstanding data threshold 309 may be decreased based at least in part on a decrease factor that is calculated from time to time. For example, equation 3 may be used to calculate the decrease factor. With the decrease factor known, the source device processing circuitry 303 may cause the value of the outstanding data threshold 309 to decrease. In various embodiments, equation 4 may be used to determine the value of the outstanding data threshold 309. Thus, in response to receiving a congestion indicator, the source device processing circuitry 303 may decrease the value of the outstanding data threshold 309.

Next, a general discussion of another example of at least a portion of the operation of the source device 103 is provided. In the following discussion, it is assumed that multiple sources have been transmitting respective flows 119 to one or more destination devices 106 via the switch 113 in the network 109. In addition, it is assumed that the source device 103 is prepared to transmit a new flow 119 to the destination device 106 via the switch 113 in the network 109.

Because the multiple sources have been transmitting the pre-existing flows 119, it may be the case that the switch 113 has reached a steady-state condition with respect to congestion. For example, the switch processing circuitry 209 may have been generating congestion indicators so that the sources have throttled their transmission rates to such levels that the quantity of data in the egress queue 116 is oscillating around the value corresponding to the congestion notification threshold 213.

Because the switch 113 may have reached such a steady-state condition, it may be likely that a new flow 119 transmitted by the source device 103 will cause the quantity of data in the egress queue 116 to exceed the congestion notification threshold 213. As a result, the switch processing circuitry 209 may cause the source device 103 to receive congestion indicators relatively soon after the new flow 119 has started transmitting. As discussed above, the source device processing circuitry 303 may decrease the value of the outstanding data threshold 309 in response to receiving the congestion indicators. Thus, it may take the new flow 119 a relatively long time to achieve a transmission rate that is substantially the same as the transmission rates of the other pre-existing flows 119.

However, in accordance with the present disclosure, the source device processing circuitry 303 may restrict one or more aspects of one or more of the outstanding data threshold operations 313 for a new flow 119. To this end, the source device processing circuitry 303 may identify whether it is transmitting a new flow 119. For example, the source device processing circuitry 303 may determine that a flow 119 that has been transmitting within a predetermined time from the initial synchronization of the flow 119 is considered a new flow 119. Additionally or alternatively, the source device processing circuitry 303 may determine that a flow 119 that has been transmitting within a predetermined time from a Retransmission Time-Out (RTO) is considered a new flow 119.

If the source device processing circuitry 303 identifies that the flow 119 is a new flow 119, the source device processing circuitry 303 may restrict one or more aspects of one or more of the outstanding data threshold operations 313. For example, the source device processing circuitry 303 may restrict an outstanding data threshold operation 313 that decreases the value of the outstanding data threshold 309. As a non-limiting example, the outstanding data threshold operation 313 may be prevented from being applied regardless of whether a congestion indicator has been received by the source device 103.

As another example, the source device processing circuitry 303 may restrict an outstanding data threshold operation 313 that increases the value of the outstanding data threshold 309. For instance, the outstanding data threshold operation 313 may be prevented from transitioning from a particular phase to another phase. As a non-limiting example, the outstanding data threshold operation 313 may be prevented from transitioning from a phase in which the outstanding data threshold 309 increases exponentially with respect to time to another phase in which the outstanding data threshold 309 increases linearly with respect to time regardless of the value of the outstanding data threshold 309.

Thus, regardless of whether congestion indicators are received by the source device 103, the value for the outstanding data threshold 309 for a new flow 119 may increase exponentially with respect to time for a first predetermined period of time, and the value for the outstanding data threshold 309 may be restricted from being decreased for a second predetermined period of time. As a result, the transmission rate for the new flow 119 may increase relatively quickly despite congestion indicators being received by the source device 103.

Various embodiments of the source device 103 may execute one or more congestion avoidance schemes 306 that do not directly adjust the outstanding data threshold 309. For these congestion avoidance schemes 306 that do not directly adjust the outstanding data threshold 309, a process that is similar to the process described above may be executed to facilitate a new flow 119 achieving a transmission rate that is substantially the same as the transmission rates of pre-existing flows 119. In this regard, the source device processing circuitry 303 may restrict at least a portion of the functionality of the congestion avoidance scheme 306 that does not directly adjust the outstanding data threshold 309. To this end, the source device processing circuitry 303 may identify whether it is transmitting a new flow 119 using, for example, one or more of the processes described above. If the source device processing circuitry 303 identifies that the flow 119 is a new flow 119, the source device processing circuitry 303 may restrict one or more aspects of the congestion avoidance scheme 306 that does not directly adjust the outstanding data threshold 309. As a result, the transmission rate for the new flow 119 may increase relatively quickly despite congestion indicators being received by the source device 103.

Figure 4:
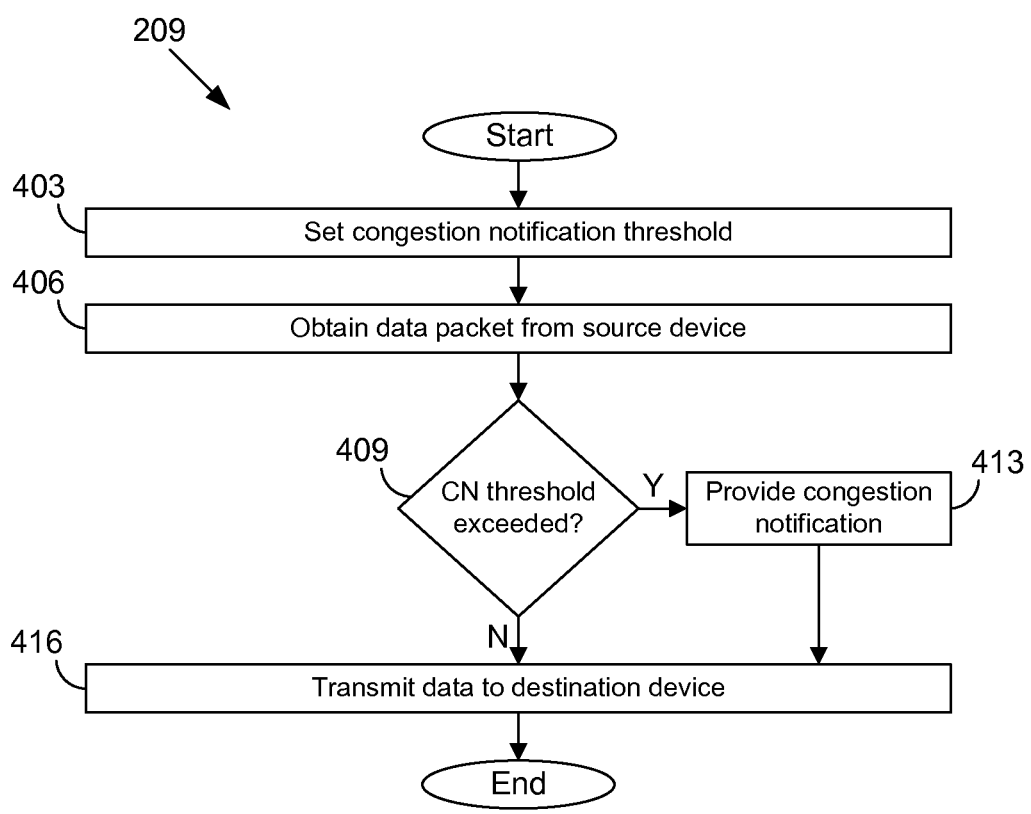
FIGS. 4-5 are flowcharts illustrating examples of functionality implemented by the switch in the networked environment of FIG. 1 according to various embodiments of the present disclosure.

Referring to FIG. 4, shown is a flowchart illustrating an example of at least a portion of the functionality implemented by the switch processing circuitry 209 according to various embodiments of the present disclosure. In particular, the flowchart of FIG. 4 illustrates an example of the switch processing circuitry 209 identifying whether to provide congestion notifications in conjunction with an outgoing data packet. It is understood that the flowchart of FIG. 4 provides merely an example of the many different types of functionality that may be implemented by the switch processing circuitry 209 as described herein. Additionally, the flowchart of FIG. 4 may be viewed as depicting an example of steps of a method implemented in the switch 113 (FIG. 1) according to one or more embodiments.

Beginning at reference number 403, the congestion notification threshold 213 (FIG. 2) is set in the switch 113. The particular value for the congestion notification threshold 213 may be static or dynamic according to various embodiments. For example, the congestion notification threshold 213 may be determined by a network administrator. Additionally or alternatively, the congestion notification threshold 213 may be determined from time to time by the switch processing circuitry 209.

As indicated at reference number 406, the switch processing circuitry 209 obtains a data packet that was transmitted from the source device 103 (FIG. 1). The switch processing circuitry 209 then identifies whether the quantity of the data in the egress queue 116 (FIG. 2) exceeds the congestion notification threshold 213, as shown at reference number 409. If so, the switch processing circuitry 209 provides a congestion notification in conjunction with the outgoing packet from the egress queue 116, as indicated at reference number 413. Such a congestion notification may be embodied in the form of, for example but not limited to, one or more flags, one or more bits, or any other type of marking that is provided in conjunction with the outgoing data from the switch 113. If the quantity of data in the egress queue 116 does not exceed the congestion notification threshold 213, the switch processing circuitry 209 may not provide a congestion notification in conjunction with the outgoing data.

As shown at reference number 416, the outgoing data is then transmitted to the destination device 106 (FIG. 1). Thereafter, the process ends.

Figure 5:
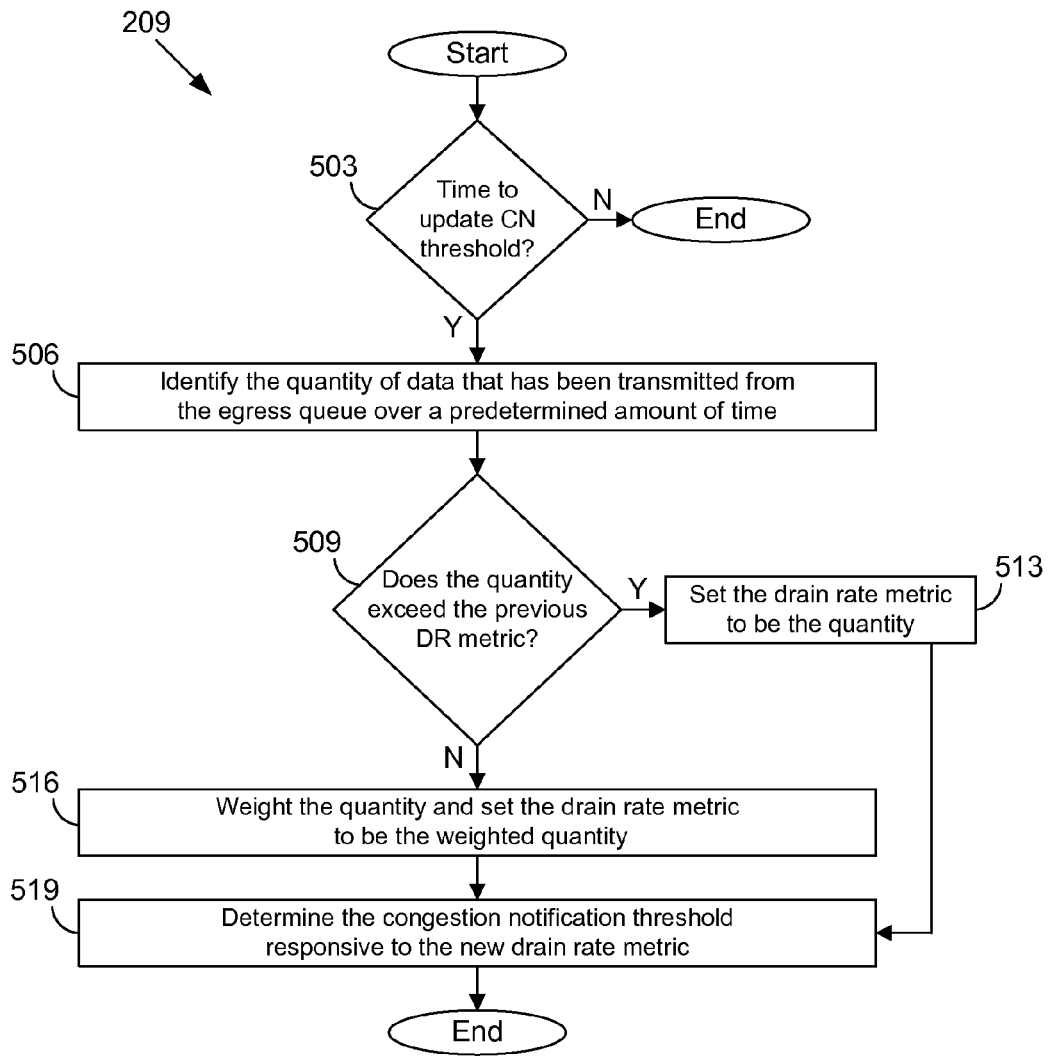

Referring to FIG. 5, shown is another flowchart illustrating an example of at least a portion of the functionality implemented by the switch processing circuitry 209 according to various embodiments of the present disclosure. In particular, the flowchart of FIG. 5 illustrates an example of the switch processing circuitry 209 adjusting the congestion notification threshold 213 (FIG. 2). It is understood that the flowchart of FIG. 5 provides merely an example of the many different types of functionality that may be implemented by the switch processing circuitry 209 as described herein. Additionally, the flowchart of FIG. 5 may be viewed as depicting an example of steps of a method implemented in the switch 113 (FIG. 1) according to one or more embodiments.

Beginning at reference number 503, the switch processing circuitry 209 identifies whether it is time to update the congestion notification threshold 213. In various embodiments, a resettable timer, for example, may be used to trigger the periodic updating of the congestion notification threshold 213. If it is not time to update the congestion notification threshold 213, the process ends.

Otherwise, the switch processing circuitry 209 identifies the quantity of data that has been transmitted from the egress queue 116 over a predetermined amount of time. In various embodiments, such a predetermined amount of time may be, for example, the amount of time elapsed since the congestion notification threshold 213 was previously updated. The quantity of data may be represented, for example, in terms of bits, bytes, packets, or any other unit of data.

As indicated at reference number 509, the switch processing circuitry 209 then identifies whether that quantity of data, which was identified at reference number 506, exceeds a previously-generated drain rate metric 216 (FIG. 2). If the quantity of data does exceed the previous drain rate metric 216, the drain rate for the egress queue 116 may be increasing. As indicated at reference number 513, the drain rate metric 216 is then updated so that the value is the same as the quantity of data that was identified at reference number 506.

If the quantity of data does not exceed the previous drain rate metric 216, the drain rate for the egress queue 116 may be decreasing. As such, the quantity of the data, which was identified at reference number 506, may be weighted, and the drain rate metric 216 may be updated based at least in part on this weighted quantity, as shown at reference number 516.

As indicated at reference number 519, the switch processing circuitry 209 then determines the updated value for the congestion notification threshold 213 based at least in part on the newly-identified drain rate metric 216. For example, the switch processing circuitry 209 may consult a look-up table that correlates drain rate metrics 216 with congestion notification thresholds 213. Thereafter, the process ends. Thus, the switch processing circuitry 209 may increase the drain rate metric 216 at substantially the same rate at which the drain rate for the egress queue 116 increases. Additionally, the switch processing circuitry 209 may decrease the drain rate metric 216 at a slower rate than the rate at which the drain rate for the egress queue 116 decreases.

Figure 6:
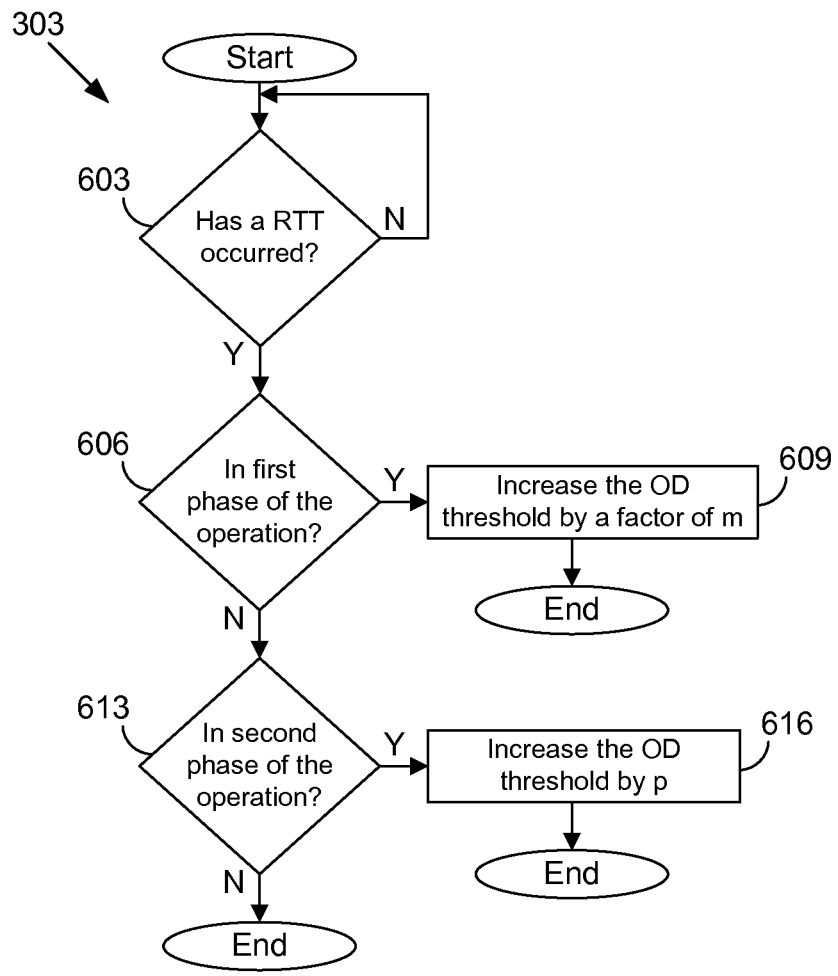
FIGS. 6-9 are flowcharts illustrating examples of functionality implemented by a source device in the networked environment of FIG. 1 according to various embodiments of the present disclosure.

Referring next to FIG. 6, shown is a flowchart illustrating an example of at least a portion of the functionality implemented by the source device processing circuitry 303 according to various embodiments of the present disclosure. In particular, the flowchart of FIG. 6 illustrates an example of the source device processing circuitry 303 employing an outstanding data threshold operation 313 that increases the outstanding data threshold 309 (FIG. 3). It is understood that the flowchart of FIG. 6 provides merely an example of the many different types of functionality that may be implemented by the source device processing circuitry 303 as described herein. Additionally, the flowchart of FIG. 6 may be viewed as depicting an example of steps of a method implemented in the source device 103 (FIG. 1) according to one or more embodiments.

Beginning at reference number 603, the source device processing circuitry 303 waits until a round trip time for a packet in the flow 119 (FIG. 1) has lapsed. To this end, a timer that corresponds to the round trip time may be used. As indicated at reference number 606, the source device processing circuitry 303 identifies whether the outstanding data threshold operation 313 is in the first phase. If so, the source device processing circuitry 303 increases the outstanding data threshold 309 by a factor of m, where m is a predetermined number, as shown at reference number 609. Thus, the outstanding data threshold 309 may increase exponentially with respect to time during the first phase of the outstanding data threshold operation 313.

If the outstanding data threshold operation 313 is not in the first phase, the source device processing circuitry 303 identifies whether the outstanding data threshold operation 313 is in the second phase, as shown at reference number 613. If so, the source device processing circuitry 303 increases the outstanding data threshold 309 by a value of p, where p is a predetermined value, as shown at reference number 616. Thereafter, the process ends. Thus, the outstanding data threshold 309 may increase linearly with respect to time during the second phase of the outstanding data threshold operation 313.

Figure 7:
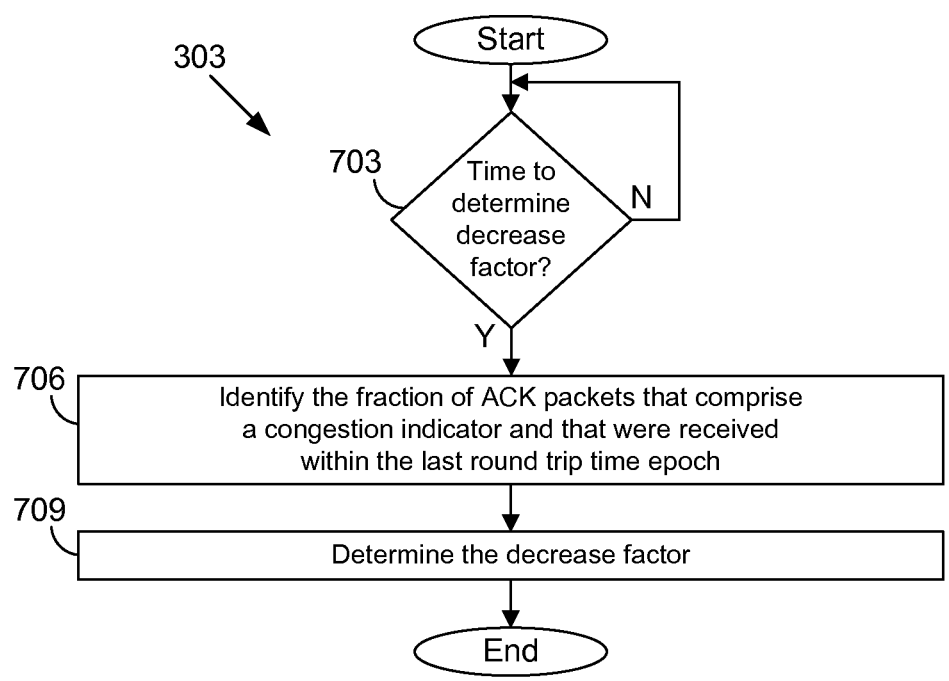

Referring to FIG. 7, shown is a flowchart illustrating an example of at least a portion of the functionality implemented by the source device processing circuitry 303 according to various embodiments of the present disclosure. In particular, the flowchart of FIG. 7 illustrates an example of the source device processing circuitry 303 determining a decrease factor for an outstanding data threshold operation 313 (FIG. 3) that decreases the outstanding data threshold 309 (FIG. 3). It is understood that the flowchart of FIG. 7 provides merely an example of the many different types of functionality that may be implemented by the source device processing circuitry 303 as described herein. Additionally, the flowchart of FIG. 7 may be viewed as depicting an example of steps of a method implemented in the source device 103 (FIG. 1) according to one or more embodiments.

Beginning at reference number 703, the source device processing circuitry 303 waits until it is time to determine the decrease factor for the outstanding data threshold operation 313. For example, the decrease factor may be determined periodically according to various embodiments. Once it is time to determine the decrease factor, the source device processing circuitry 303 identifies the fraction of received acknowledgement packets that comprise a congestion indicator and that were received within the last round trip time epoch, as shown at reference number 706. Using this information, the source device processing circuitry 303 determines the value for the decrease factor, as indicated at reference number 706. To this end, equation 3, for example, may be used. Thereafter, the process ends.

Figure 8:
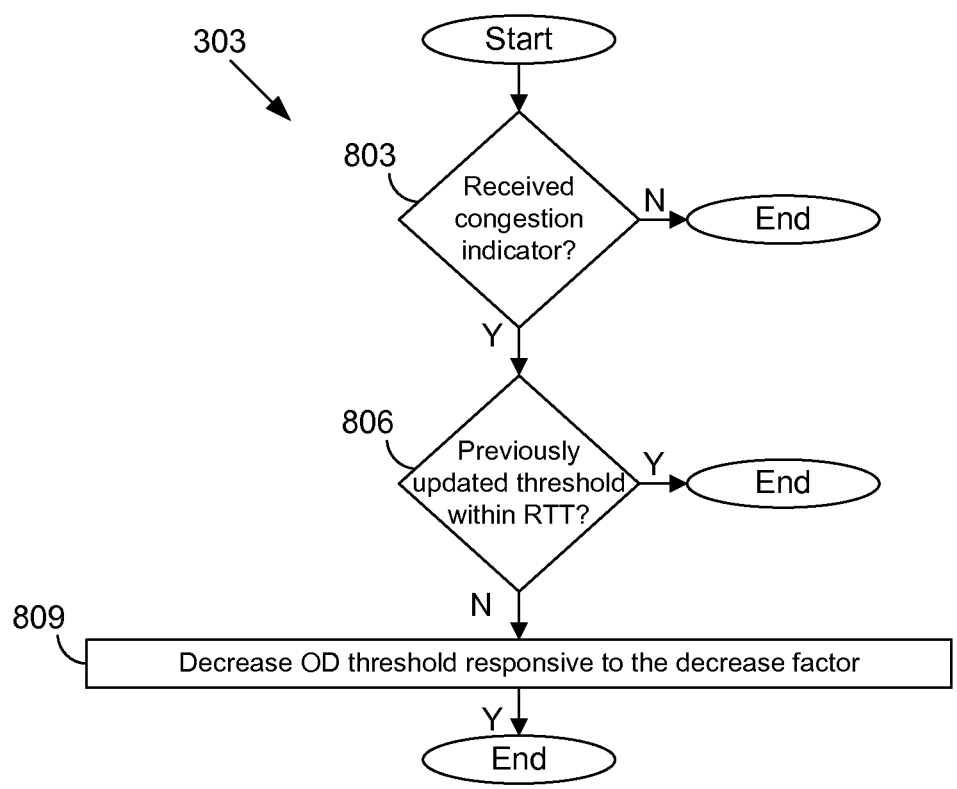

Referring next to FIG. 8, shown is a flowchart illustrating an example of at least a portion of the functionality implemented by the source device processing circuitry 303 according to various embodiments of the present disclosure. In particular, the flowchart of FIG. 8 illustrates an example of the source device processing circuitry 303 performing an outstanding data threshold operation 313 (FIG. 3) that decreases the value of the outstanding data threshold 309. It is understood that the flowchart of FIG. 8 provides merely an example of the many different types of functionality that may be implemented by the source device processing circuitry 303 as described herein. Additionally, the flowchart of FIG. 8 may be viewed as depicting an example of steps of a method implemented in the source device 103 (FIG. 1) according to one or more embodiments.

Beginning at reference number 803, the source device processing circuitry 303 identifies whether it has obtained a congestion indicator from the destination device 106 (FIG. 1). The congestion indicator may be, for example, one or more bits, flags, or other types of markings that were transmitted in conjunction with an acknowledgement packet. If a congestion indicator was not received, the process ends.

Otherwise, the source device processing circuitry 303 identifies whether the outstanding data threshold 309 was previously updated by the outstanding data threshold operation 313 within the last round trip time for a packet in the flow 119 (FIG. 1), as indicated at reference number 806. If so, the process ends. Otherwise, the value of the outstanding data threshold 309 is decreased based at least in part on the decrease factor, as indicated at reference number 809. The decrease factor may be determined, for example, as shown in FIG. 7. Thereafter, the process ends.

Figure 9:
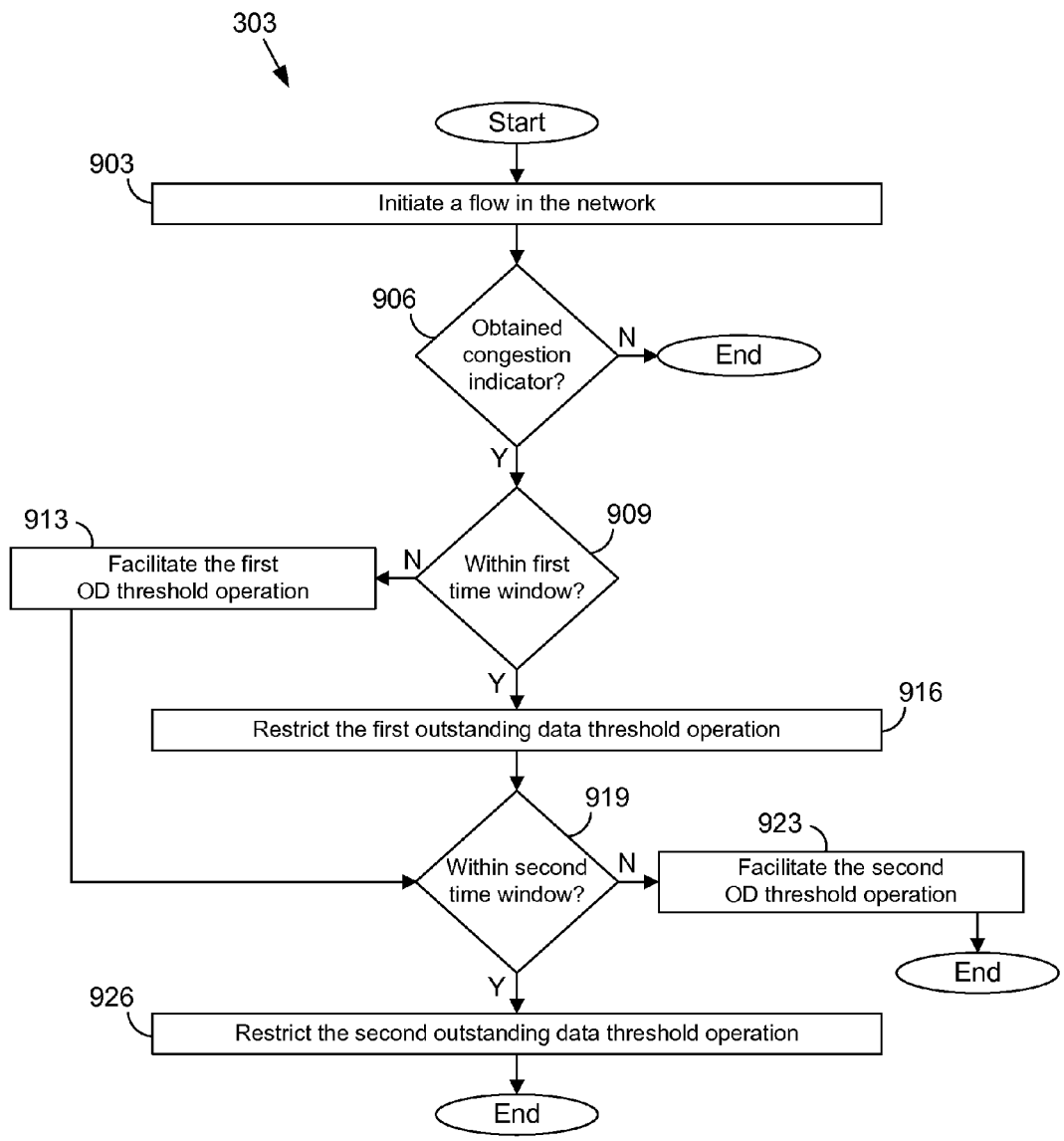

Referring to FIG. 9, shown is a flowchart illustrating an example of at least a portion of the functionality implemented by the source device processing circuitry 303 according to various embodiments of the present disclosure. In particular, the flowchart of FIG. 9 illustrates an example of the source device processing circuitry 303 determining whether to restrict or facilitate outstanding data threshold operations 313 (FIG. 3). It is understood that the flowchart of FIG. 9 provides merely an example of the many different types of functionality that may be implemented by the source device processing circuitry 303 as described herein. Additionally, the flowchart of FIG. 9 may be viewed as depicting an example of steps of a method implemented in the source device 103 (FIG. 1) according to one or more embodiments.

Beginning at reference number 903, a new flow 119 is initiated in the network 109 (FIG. 1). As shown at reference number 906, it is identified whether a congestion indicator has been obtained by the source device 103. The congestion indicator may, for example, be one or more bits, flags, or any other type of mark that was transmitted in conjunction with an acknowledgement packet for the flow 119. If a congestion indicator was not received, the process ends.

Otherwise, as shown at reference number 909, the source device processing circuitry 303 then identifies whether the time that has passed since initiating the new flow 119 is within a first time window. In various embodiments, such a time window may, for example, be determined by a network administrator. If the time that has passed is outside of the first time window, the source device processing circuitry 303 facilitates the first outstanding data threshold operation 313, as indicated at reference number 913. As a non-limiting example, the source device processing circuitry 303 may facilitate the outstanding data threshold operation 313 decreasing the value of the outstanding data threshold 309.

If the time that has passed is within the first time window, the source device processing circuitry 303 restricts the first outstanding data threshold operation 313, as shown at reference number 916. For example, the source device processing circuitry 303 may prevent the first outstanding data threshold operation 313 from decreasing the value of the outstanding data threshold 309.

At reference number 919, it is determined whether the amount of time that has passed is within a second time window. As shown at reference number 923, if the time that has passed is outside of the second time window, the source device processing circuitry 303 facilitates a second outstanding data threshold operation 313. For example, the source device processing circuitry 303 may allow the second outstanding data threshold operation 313 to transition from a first phase to a second phase.

If the time that has passed is within the second time window, the source device processing circuitry 303 restricts the second outstanding data threshold operation 313, as indicated at reference number 926. For example, the source device processing circuitry 303 may prevent the outstanding data threshold operation 313 from transitioning from a first phase to a second phase. Thereafter the process ends.

Although the flowcharts of FIGS. 4-9 show a specific order of execution, it is understood that the order of execution may differ from that which is depicted. For example, the order of execution of two or more items may be switched relative to the order shown. Also, two or more items shown in succession may be executed concurrently or with partial concurrence. Further, in some embodiments, one or more of the items shown may be skipped or omitted. Additionally, one or more items shown in one flow chart may be executed concurrently or partially concurrently with one or more items shown in another flowchart. In addition, any number of elements might be added to the logical flow described herein, for purposes of enhanced utility, accounting, performance measurement, providing troubleshooting aids, etc. It is understood that all such variations are within the scope of the present disclosure.

The components described herein may be implemented by circuitry. In this regard, such circuitry may be arranged to perform the various functionality described above by generating and/or responding to electrical or other types of signals. The circuitry may be general purpose hardware or hardware that is dedicated to performing particular functions. The circuitry may include, but is not limited to, discrete components, integrated circuits, or any combination of discrete components and integrated circuits. Such integrated circuits may include, but are not limited to, one or more microprocessors, system-on-chips, application specific integrated circuits, digital signal processors, microcomputers, central processing units, programmable logic devices, state machines, other types of devices, and/or any combination thereof. The circuitry may also include interconnects, such as lines, wires, traces, metallization layers, or any other element through which components may be coupled. Additionally, the circuitry may be configured to execute software to implement the functionality described herein.

Also, component and/or functionality described herein, including the switch processing circuitry 209 and the source device processing circuitry 303, can be embodied in any computer-readable medium, such as a non-transitory medium or a propagation medium, for use by or in connection with a system described herein. In this sense, the logic may comprise, for example, statements including instructions and declarations that can be fetched from the computer-readable medium and executed by the instruction execution system. In the context of the present disclosure, a "computer-readable medium" can be any medium that can propagate, contain, store, or maintain the logic, functionality, and/or application described herein.

The computer-readable medium can comprise any one of many physical media such as, for example, magnetic, optical, or semiconductor media. More specific examples of a suitable computer-readable medium may include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM), dynamic random access memory (DRAM), and/or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system, comprising:
   a source device configured to transmit a plurality of data flows in a network, the source device comprising circuitry configured to:
   initiate an new data flow in the network;
   obtain an indication of congestion in the network;
   in response to the indication, initiate congestion avoidance for the plurality of data flows;
   determine an amount of time that has elapsed between initiation of the new data flow; and
   maximize an increase in the transmission rate for the new data flow by suspending congestion avoidance, at least in part, with respect to the new data flow when the amount of time that has elapsed is below a predetermined threshold.

2. The system of claim 1, wherein the congestion avoidance comprises increasing a threshold that specifies a maximum amount of outstanding data for which the source device is to await an acknowledgement from a destination device.

3. The system of claim 1, wherein the congestion avoidance comprises decreasing a threshold that specifies a maximum amount of outstanding data for which the source device is to await an acknowledgement from a destination device.

4. The system of claim 1, wherein the circuitry is configured to restrict the congestion avoidance from transitioning from a first phase to a second phase with respect to the new data flow when the amount of elapsed time is less than the predetermined threshold.

5. The system of claim 4, wherein the congestion avoidance includes an exponential increase in a threshold relative to a round trip time for at least one of the plurality of data flows during the first phase, the threshold specifying a maximum amount of outstanding data for which the source device is to await an acknowledgement from a destination device.

6. The system of claim 4, wherein the congestion avoidance includes a linear increase in a threshold relative to a round trip time for at least one of the plurality of data flows during the second phase, the threshold specifying a maximum amount of outstanding data for which the source device is to await an acknowledgement from a destination device.

7. The system of claim 1, wherein the circuitry is configured to restrict the congestion avoidance from being applied to the new data flow when the amount of time is below the predetermined threshold.

8. A method, comprising:
   initiating, using a source device, a new data flow in a network, the source device transmitting a plurality of data flows in the network;
   obtaining, in the source device, an indication of congestion in the network;
   in response to the indication, initiating, by the source device, congestion avoidance for the plurality of data flows;
   determining, in the source device, an amount of time that has elapsed between initiation of the new data flow; and
   maximizing an increase in the transmission rate for the new data flow by suspending, by the source device, the congestion avoidance, at least in part, with respect to the new data flow when the amount of time that has elapsed is below a predetermined threshold.

9. The method of claim 8, wherein obtaining the indication of the congestion comprises obtaining an acknowledgement packet from a destination device.

10. The method of claim 8, further comprising initiating an exponential increase of a threshold relative to a round trip time for at least one of the plurality of data flows at a same time as the initialization of the congestion avoidance.

11. The method of claim 8, wherein the congestion avoidance comprises increasing a threshold that specifies a maximum amount of outstanding data for which the source device is to await an acknowledgement from a destination device.

12. The method of claim 8, wherein the congestion avoidance comprises decreasing a threshold that specifies a maximum amount of outstanding data for which the source device is to await an acknowledgement from a destination device.

13. The method of claim 8, further comprising restricting the congestion avoidance from transitioning from a first phase to a second phase with respect to the new data flow when the amount of time is below the predetermined threshold.

14. The method of claim 8, further comprising restricting the congestion avoidance from being applied to the new data flow when the amount of time is below the predetermined threshold.

15. A system, comprising:
   a switch comprising circuitry configured to:
   transmit data using an egress port comprising an egress queue;
   set a congestion notification threshold for the egress queue;
   generate a drain rate metric responsive to a drain rate for the egress queue; and
   adjust the congestion notification threshold responsive to the drain rate metric by selecting the congestion notification threshold from a table that associates congestion notification threshold values to drain rate metric values, the congestion notification threshold being adjusted so as to maximize an increase in the transmission rate for the new data flow by suspending congestion avoidance with respect to a newly added data flow for a predetermined amount of time.

16. The system of claim 15, wherein the circuitry is configured to:
   identify an increase in the drain rate for the egress queue; and
   in response to the increase, generate the drain rate metric such that the drain rate and the drain rate metric increase at substantially a same rate.

17. The system of claim 15, wherein the circuitry is configured to:
   identify a decrease in the drain rate for the egress queue; and
   in response to the decrease, generate the drain rate metric such that the drain rate metric decreases less than a decrease rate for the drain rate.

18. The system of claim 15, wherein the switch comprises a plurality of class of service (CoS) queues configured to transmit the data to the egress queue.

19. The system of claim 15, wherein the circuitry is configured to periodically adjust the congestion notification threshold.

20. The system of claim 15, wherein the circuitry is configured to:
   identify an instance of a quantity of data in the egress queue exceeding the congestion notification threshold; and
   in response to the instance, provide a packet transmitted by the egress port with a congestion indicator.

* * * * *